(12) United States Patent
Coffman et al.

(10) Patent No.: US 8,676,406 B2
(45) Date of Patent: Mar. 18, 2014

(54) UNMANNED AERIAL VEHICLE CONTROL USING A GAMEPAD

(75) Inventors: Jason R. Coffman, Herndon, VA (US); Lee Solomon, Fairfax, VA (US)

(73) Assignee: Raytheon Company, Waltham, MA (US)

(*) Notice: Subject to any disclaimer, the term of this patent is extended or adjusted under 35 U.S.C. 154(b) by 296 days.

(21) Appl. No.: 13/099,955

(22) Filed: May 3, 2011

(65) Prior Publication Data
US 2012/0280087 A1 Nov. 8, 2012

(51) Int. Cl.
*G05D 1/00* (2006.01)
(52) U.S. Cl.
USPC .................................................. 701/3
(58) Field of Classification Search
USPC ............................ 701/2, 3, 11, 23, 24, 25, 26
See application file for complete search history.

(56) References Cited

U.S. PATENT DOCUMENTS

| | | | |
|---|---|---|---|
| 3,742,495 A | 6/1973 | Diamantides | |
| 4,334,221 A | 6/1982 | Rosenhagen et al. | |
| 4,691,659 A | 9/1987 | Ito et al. | |
| 5,552,983 A | 9/1996 | Thornberg et al. | |
| 5,904,724 A | 5/1999 | Margolin | |
| 5,923,270 A | 7/1999 | Sampo et al. | |
| 6,694,228 B2 | 2/2004 | Rios | |
| 7,127,333 B2 | 10/2006 | Arvidsson | |
| 7,343,232 B2 | 3/2008 | Duggan et al. | |
| 7,437,225 B1 * | 10/2008 | Rathinam | 701/14 |
| 7,471,216 B2 * | 12/2008 | Chen et al. | 341/20 |
| 7,731,588 B2 | 6/2010 | Templeman | |
| 2003/0060906 A1 | 3/2003 | Kim | |
| 2005/0269769 A1 * | 12/2005 | Naghi et al. | 273/148 B |
| 2006/0223637 A1 | 10/2006 | Rosenberg | |
| 2008/0070684 A1 * | 3/2008 | Haigh-Hutchinson | 463/32 |
| 2008/0195309 A1 * | 8/2008 | Prinzel, III et al. | 701/208 |
| 2009/0319100 A1 * | 12/2009 | Kale et al. | 701/4 |

* cited by examiner

*Primary Examiner* — Khoi Tran
*Assistant Examiner* — Adam Mott
(74) *Attorney, Agent, or Firm* — Cantor Colburn LLP (57) ABSTRACT

In accordance with particular embodiments, a system includes a path creation module configured to create future flight paths for unmanned aerial vehicles (UAVs). Each future flight path comprises one or more branch points marking changes in the UAV's flight path. The system also includes a display that is configured to present a graphical user interface that may include a 3D view of a geographic area; flight paths; and a menu of commands. The system also includes a gamepad that may include two thumb-sticks to adjust the displayed geographic area and the perspective of the displayed geographic area. The gamepad also includes time buttons configured to scroll through a flight time that begins with a current actual time and ends with the end of the UAV's flight. The gamepad further includes buttons configured to select a command from the menu and to select a first future flight path of the one or more future flight paths to be sent to the UAV.

20 Claims, 4 Drawing Sheets

UNMANNED AERIAL VEHICLE CONTROL USING A GAMEPAD

TECHNICAL FIELD OF THE INVENTION

This invention relates in general to controlling an unmanned aerial vehicle (UAV) and, more particularly, to systems and methods for controlling a UAV using a gamepad.

BACKGROUND

The control stations for unmanned aerial vehicles (UAVs) typically resemble airplane cockpits. Typically the UAVs are controlled by a combination of a joystick and a mouse and keyboard. The joystick may be used for direct control, and in some instances vector control and the mouse and keyboard may be used for waypoint control.

Direct control involves a user directly controlling the flight of the UAV in a real-time manner. The user is provided with information regarding the flight of the UAV (e.g., heading, orientation, etc.) and the user provides commands for making adjustments to the UAV's flight path.

Waypoint control involves a user setting numerous waypoints for the UAV to travel through. The UAV's autopilot is provided with a list of waypoints with associated parameters for how those waypoints are satisfied. Information regarding the waypoints is typically provided by the user through a mouse and keyboard. The user typically does not need to intervene during the flight of the UAV, except where the UAV ventures off course.

In vector control, a user may be responsible for determining, in near real-time, a vector for a path for the UAV. The user may then monitor the UAV's flight path and orientation via telemetry from onboard navigation systems. The user then provides indirect control of the aircraft by commanding vector changes to an onboard autopilot via a joystick or a mouse and keyboard combination. The onboard autopilot regulates the UAV's heading, altitude, speed, and orientation to align with the user supplied vector.

SUMMARY

From the foregoing, it may be appreciated that a need has arisen for a method and system for controlling a UAV using a gamepad that includes a path creation module configured to create one or more future flight paths for one or more unmanned aerial vehicles (UAVs). Each future flight path comprises one or more branch points marking a change in the UAV's flight path. The system also includes a display that is configured to present a graphical user interface. The graphical user interface may include a three-dimensional view of a geographic area; one or more lines representing each of the one or more future flight paths for the one or more UAVs; and a menu comprising one or more commands available for selection. The system also includes a gamepad. The gamepad includes at least one thumb-stick configured to adjust the geographic area displayed on the display and at least one thumb-stick configured to adjust a perspective of the displayed geographic area. The gamepad also includes at least two time buttons configured to scroll through a flight time. The flight time begins with a current actual time and ends with the end of the UAV's flight. The gamepad further includes a plurality of buttons configured to select a command from the menu. The selected command is associated with a current flight time selected by the at least two time buttons. The plurality of buttons are further configured to select a first future flight path of the one or more future flight paths to be sent to the UAV to control an actual flight path of the UAV.

Technical advantages of particular embodiments may include using a traditional gamepad with two analog (or pressure sensitive) thumb-sticks to create future flight paths which are uploaded a UAV to control the actual flight path of the UAV. This may improve the efficiency with which UAV users are able to create, modify, and/or select future flight paths for the UAVs. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

A better understanding of particular embodiments will be realized from the detailed description which follows, taken in conjunction with the accompanying drawings, in which.

DETAILED DESCRIPTION OF THE DRAWINGS

Figure 1:
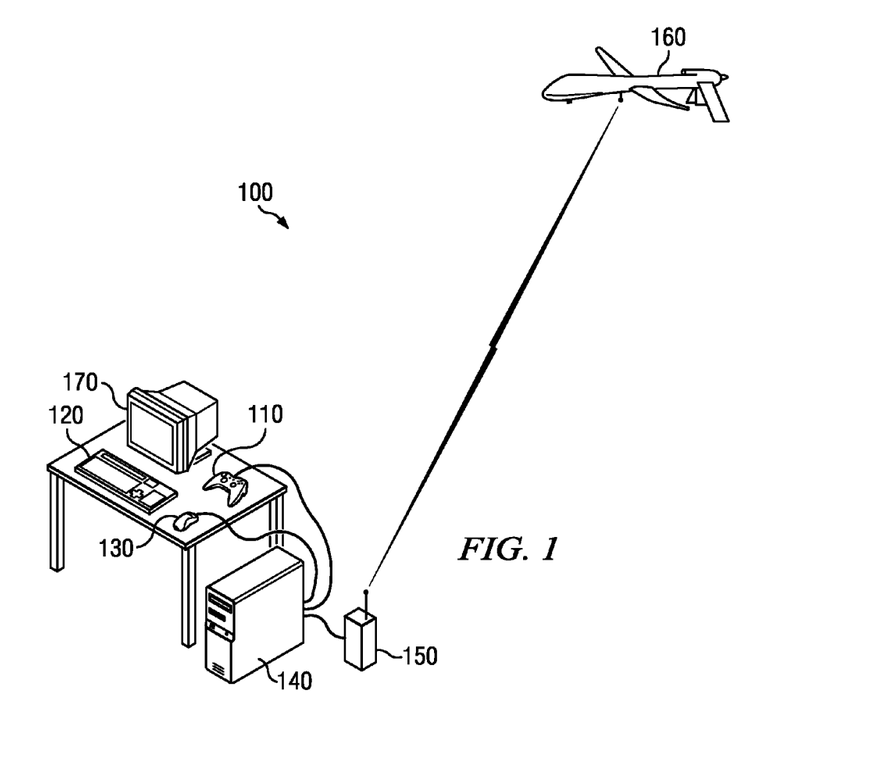
FIG. 1 is a block diagram of a system used to control an unmanned aerial vehicle using a gamepad, in accordance with particular embodiments.

FIG. 1 is a block diagram of a system used to control an unmanned aerial vehicle (UAV) using a standard gamepad. In the depicted embodiment, UAV control system 100 includes gamepad 110, keyboard 120, mouse 130, computer system 140, UAV controller 150, and display 170. These components may work together to allow a user, such as a pilot or UAV operator, to control UAV 160 and/or any number of additional UAVs. For example, UAV control system 100 may be based on a control scheme in which a user creates various future flight paths in a time-based manner, as discussed in more detail below. The user then selects one of the different future flight paths to be used to control UAV 160. The selected future flight path is then uploaded and used to control UAV 160. The user may be able to create the future flight paths using gamepad 110.

Gamepad 110 may be any one of a variety of different commercially available gamepad controllers. Gamepad 110 may be a gamepad traditionally used with any of a variety of different game console or computers. In some embodiments, different users may use different gamepads with the same UAV control system 100. In particular embodiments, gamepad 110 may include at least two analog thumb-sticks, at least one directional pad, and at least seven buttons. In certain embodiments, two of the seven buttons may be analog buttons. While the two thumb-sticks and at least two of the buttons have been referred to as analog, these components may not necessarily be analog. Rather, the analog thumb-sticks and buttons may comprise any type of thumb-stick or button in which the user is able to control the magnitude of the resulting signal provided to computer 140. For example, the thumb-sticks and/or buttons may be pressure sensitive components in which the harder the component is pressed, the greater the resulting response. By controlling the magnitude of the signal provided to computer 140, a user may, for example, be able to control how fast the image displayed on display 170 is panned. Depending on the embodiment and/or scenario gamepad 110 may have a wired or wireless connection to computer 140.

In certain embodiments, control system 100 may also allow a user to use a mouse 130 and keyboard 120 in addition to gamepad 110 to enter, modify, or otherwise provide control information for UAV 160. While mouse 130 and keyboard 120 may be used to supplement the control of gamepad 110, in certain embodiments, gamepad 110 may be the primary or the only input mechanism used to enter, modify, or otherwise provide control of the future flight path of UAV 160.

Depending on the embodiment, computer 140 may be a general purpose computer or a specialized computer designed specifically for providing UAV control. In those embodiments in which computer 140 is a general purpose computer, computer 140 may have installed thereon software designed to generate a user interface through which a user may use gamepad 110 to enter and modify future flight paths for UAV 160. Computer 140 may also have installed thereon software designed to generate control signals, protocols, or instructions used to aid in the navigation of UAV 160.

Once a future flight path has been entered in computer 140 and selected for use by UAV 160, the future flight path may be sent to UAV controller 150. UAV controller 150 may then translate or transform the selected future flight path into navigation or control commands for UAV 160. These commands may then be wirelessly relayed to UAV 160. Depending on the embodiment, UAV controller 150 may be a component or part of computer 140 or UAV 160. In those embodiments in which UAV controller 150 is a component of UAV 160, computer 140 may include or be connected to an antenna configured to wirelessly transmit the selected future flight path to UAV controller 150 on UAV 160.

The graphical user interface generated by computer 140, and presented to a user on display 170, includes, among other elements, a timeline, a three-dimensional (3D) map, one or more menus (e.g., pop-up menus) and one or more future flight paths for one or more UAVs (e.g., UAV 160). For example, computer 140 may present a user with an overhead 3D map of a particular geographic area (e.g., a geographic area corresponding to the location of UAV 160). One or more future flight paths may be presented (e.g., in ghost form) over the image of the geographic area. Display 170 may also present an icon representing each UAV being controlled by computer 140. As the user advances or rewinds the flight time, the UAV icons may move along their selected path. In addition, in some embodiments, a marker may similarly move along any alternate future flight paths associated with the UAVs.

The future flight paths (such as those depicted in FIG. 4) may begin with a simple straight line. This may represent UAV 160 flying along a relatively constant heading after take-off. Beginning at the start of UAV 160's flight, a user may use gamepad 110 (e.g. shoulder buttons on gamepad 110) to advance time forward to a point in time at which he wants UAV 160 to deviate in some way from the immediately preceding heading. In particular embodiments, a user may move forward or backward through flight time using different shoulder buttons on gamepad 110 (for example, shoulder button 350*a* and 350*b* depicted in FIGS. 3A and 3B). Once the user has advanced to the desired flight time, the user may then use gamepad 110 to call up a menu with a list of options for how the user can modify the selected future flight path of UAV 160. The user may then select the desired command for UAV 160 from the menu. The available commands presented in the menu may correspond to commands that are understood by the navigation system of UAV 160 or UAV controller 150. For example, the commands may include, but are not limited to, turn left, turn shallow left, turn hard left, turn right, turn shallow right, turn hard right, circle around clockwise, circle around counter clockwise, change elevation up, change elevation down, go straight, etc. Other commands may include varying degrees of the commands listed above or different commands such as different observation patterns (e.g., a figure 8 pattern). In some embodiments, the user may be able to customize the commands. For example, the user may be able to use a thumb stick to set the extent or degree of a left or right turn.

The user may enter as many commands at as many different points in the flight time as desired. Each entered command may create a branch point in which a new future flight path may begin based on the entered command. The existing future flight path may continue its previous path (e.g., heading, speed, etc.). This may be because a new command creating a branch point does not necessarily replace or remove the existing future flight path from which the newly entered future flight path branches. Computer 140 may store each of the created future flight paths for UAV 160 (and any other UAVs being controlled by gamepad 110 through computer 140). The user may then be able to use gamepad 110 to select for uploading to UAV 160, one of the several different future flight paths to be used as the actual flight path for UAV 160. The user may also be able to change which future flight path is uploaded during the course of UAV 160's actual flight.

Display 170 may be configured to receive video images from computer 140. In certain embodiments, display 170 may comprise a color monitor, TV, or other display apparatus. In certain embodiments, display 170 may be integrated with other equipment, such as a tactical display within a vehicle.

Although computer 140 is shown being connected directly to UAV controller 150 which in turn is wirelessly connected to UAV 160, such a configuration is not required. In some embodiments, one or more wired or wireless networks may be interspersed between components of UAV controller 150.

Figure 2:
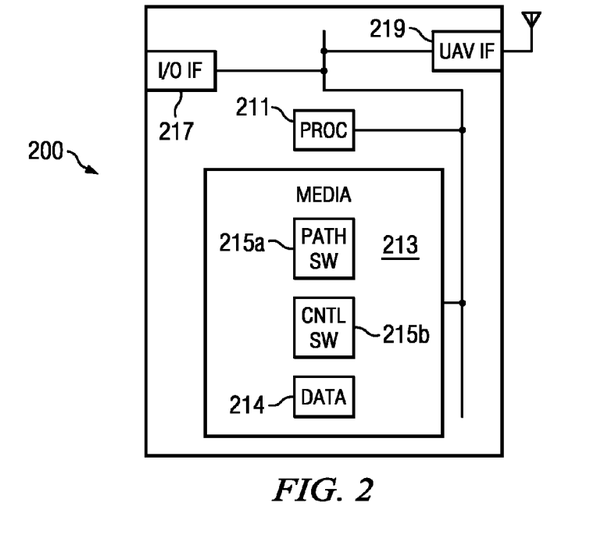
FIG. 2 is a detailed block diagram of a computer used to control an unmanned aerial vehicle using a gamepad, in accordance with particular embodiments.

FIG. 2 is a detailed block diagram of a computer used to control an unmanned aerial vehicle using a gamepad, in accordance with particular embodiments. Computer 200 includes processor 211, bus 212, media 213, path selection module 215*a*, control module 215*b*, data 214, input/output (I/O) interface 217, and UAV interface 219. These components, described individually in more detail below, may provide a user interface through which a user may be able to use a gamepad to create future flight paths that may be selected to control the actual flight path of a UAV. Although a particular computer 200 is depicted having a particular number of particular components in a particular arrangement, this disclosure contemplates any suitable computer 200 having any suitable number of any suitable components in any suitable arrangement.

Processor 211 may be a microprocessor, ASIC, FPGA, controller, or any other suitable computing devices, resources, or combinations of hardware, software and/or encoded logic operable to provide, either alone or in conjunction with other components (e.g., media 213), future flight path creation and selection functionality. Such functionality may include providing a graphical user interface through which a user may be able to create, modify, and/or select any number of future flight paths for any number of UAVs. For example, processor 211 may determine the location of an icon representing a UAV based on the timing information provided by a user and the future flight path or paths for the respective UAV. Additional examples and functionality provided, at least in part, by processor 211 will be discussed below.

In particular embodiments, processor 211 may include hardware for executing instructions, such as those making up a computer program. As an example and not by way of limitation, to execute instructions, processor 211 may retrieve (or fetch) instructions from an internal register, an internal cache, media 213, or other tangible computer readable storage media; decode and execute them; and then write one or more results to an internal register, an internal cache, media 213, or other tangible computer readable storage media.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in media 213 and the instruction caches may speed up retrieval of those instructions by processor 211 (and/or 221). Data in the data caches may be copies of data 214 in media 213 or other tangible computer readable storage media for instructions executing at processor 211 to operate on; the results of previous instructions executed at processor 211 for access by subsequent instructions executing at processor 211, or for writing to media 213 or another tangible computer readable storage media; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Bus 212 may include any combination of hardware, software embedded in a computer readable medium, and/or encoded logic incorporated in hardware or otherwise stored (e.g., firmware) to couple components of computer 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate. In particular embodiments, one or more buses 212 (which may each include an address bus and a data bus) may couple processor 211 to media 213. Bus 212 may include one or more memory buses, as described below. In particular embodiments, one or more memory management units (MMUs) may reside between processor 211 and media 213 and facilitate accesses to media 213 requested by processor 211. In particular embodiments, media 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory.

Media 213 may be any form of volatile or non-volatile memory including, without limitation, magnetic media, optical media, random access memory (RAM), read-only memory (ROM), flash memory, removable media, or any other suitable local or remote memory component or components. Media 213 may store any suitable data 214 or information utilized by computer 200, including software embedded in a computer readable medium, and/or encoded logic incorporated in hardware or otherwise stored (e.g., firmware). In particular embodiments, media 213 may include main memory for storing instructions for processor 211 to execute or data 214 for processor 211 to operate on. As an example and not by way of limitation, computer 200 may load instructions from media 213 or another source (such as, for example, another computer system, another base station, or a remote transceiver) to media 213. Processor 211 may then load the instructions from media 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to media 213. In particular embodiments, processor 211 may execute only instructions in one or more internal registers or internal caches or in media 213 and may operate only on data in one or more internal registers or internal caches or in media 213. Media 213 may include one or more components or devices where appropriate.

In particular embodiments, media 213 may include mass storage for data 214 or instructions. As an example and not by way of limitation, media 213 may include an HDD, a floppy disk drive, flash memory, an optical disc, a magneto-optical disc, magnetic tape, or a Universal Serial Bus (USB) drive or a combination of two or more of these. Media 213 may include removable or non-removable (or fixed) media, where appropriate. Media 213 may be internal or external to computer 200, where appropriate. In particular embodiments, media 213 may be non-volatile, solid-state memory. In particular embodiments, media 213 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Media 213 may take any suitable physical form and may comprise any suitable number or type of storage. Media 213 may include one or more storage control units facilitating communication between processor 211 and media 213, where appropriate.

Path module 215a may comprise any hardware, encoded software, embedded logic, or a combination thereof, to provide, create, modify, and select future flight paths for UAVs. In some embodiments, path module 215a may comprise a software program that is installed on computer 200. In some embodiments, path module 215a may be a separate device configured to be connected to computer 200. In particular embodiments, path module 215a may be configured to generate the visual components (e.g., a 3D map, any created future flight paths, menus, etc.) of a graphical user interface to be displayed on a display device. In some embodiments, path module 215a may be configured to receive gamepad inputs from a user to manipulate (e.g., pan, zoom, etc.) the visual components displayed on display 170 and to create, modify, and/or select future flight paths.

The future flight paths for a single UAV may include numerous different branch points (e.g., branch points 424 and 434 depicted in FIG. 4) or optional future flight paths that a user may select for a UAV. Path module 215a may maintain, or cause to be maintained, information regarding these different future flight paths for any number of different UAVs. This may allow a user to create multiple future flight paths for multiple UAVs before any of the UAVs take-off. The user may then select the appropriate future flight path for each UAV based on observed conditions or flight parameters.

In certain embodiments, path module 215a may interpret various inputs and button selections entered on a gamepad, such as gamepad 110 depicted in FIG. 1. For example, in some embodiments, path module 215a may pan across the 3D map at a faster rate the farther a thumb-stick of the gamepad is moved from its center position. As another example, path module 215a may tilt the camera angle or rotate the 3D map based on up/down or left/right movement, respectively, of a second thumb-stick. As another example, path module 215a may zoom in or out based on a user pressing one of two zoom buttons. One of the two zoom buttons may correspond to zooming-in and the other zoom button may correspond to zooming-out. Depending on the embodiments, the zoom rate may depend on the length of time the user presses the button (e.g., the longer the user presses the button, the faster the zoom rate), the amount of pressure the user applies to the button, or the distance the user moves the button from its resting position. Path module 215a may also be configured to generate different menus based on different button selections entered by a user on a gamepad. For example, one button may be associated with calling up, or closing, a pop-up menu. The pop-up menu may be context specific based on when the button is pressed, where a cursor is on the displayed image, and/or what item (e.g., UAV icon, future flight, etc.) is selected. In another example, a user may be able to cycle through different UAVs and/or future flight paths using, for example, a directional pad on the gamepad. In certain embodiments, one or more drivers may be installed on computer 200 based on the gamepad. The drivers may allow path module 215a to receive and interpret input commands from the gamepad.

Control module 215b may comprise any hardware, encoded software, embedded logic, or a combination thereof, to generate and/or relay navigational control information to a UAV. Once a user has selected a future flight path created through path module 215a, path module 215a may provide information indicative of the selected future flight path to control module 215b. Control module 215b may then use the provided information to create the necessary navigation control and/or navigation commands for the appropriate UAV. In certain embodiments, the available menu commands presented to a user via path module 215a may be based on the navigational control commands which control module 215b understands.

Herein, reference to a computer-readable storage media encompasses one or more tangible computer-readable storage media possessing structures. As an example and not by way of limitation, a computer-readable storage media may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage media or a combination of two or more of these, where appropriate. Herein, reference to a computer-readable storage media excludes any media that is not eligible for patent protection under 35 U.S.C. §101. Herein, reference to a computer-readable storage media excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage media implements one or more portions of processor 211 (such as, for example, one or more internal registers or caches), one or more portions of media 213, one or more portions of another tangible computer readable storage media, or a combination of these, where appropriate. In particular embodiments, a computer-readable storage media implements RAM or ROM. In particular embodiments, a computer-readable storage media implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In particular embodiments, I/O interface 217 may include any hardware, encoded software, embedded logic, or a combination thereof to provide one or more interfaces for facilitating communication between computer 200 and a user. In some embodiments, I/O interface 217 may include one or more interfaces for one or more I/O devices. One or more of these I/O devices may enable communication between the user and computer 200. As an example and not by way of limitation, an I/O device may include a gamepad, keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of I/O interfaces 217 for them. Where appropriate, I/O interface 217 may include one or more devices or encoded software drivers enabling processor 211 to drive one or more of these I/O devices. In some embodiments, I/O interface 217 may include a network interface controller (NIC) or network adapter for communicating with a wired network and/or a wireless NIC (WNIC) or wireless adapter for communicating with a wireless network. Interface 217 may include one or more interfaces 217, where appropriate.

In particular embodiments, UAV interface 219 may include any hardware, encoded software, embedded logic, or a combination thereof used to provide one or more interfaces for facilitating communication between computer 200 and a UAV. In some embodiments, UAV interface 219 may comprise one or more radios coupled to one or more antennas. In such an embodiment, interface 219 may receive UAV control or navigation data that is to be sent out to one or more UAVs, such as UAV 160 depicted in FIG. 1, via a wireless connection. The radio may convert the digital data into a radio signal having the appropriate center frequency, bandwidth parameters, and transmission power. The data to be transmitted wirelessly may be encrypted or scrambled before it is transmitted to the UAV. Similarly, the radios may convert radio signals received via the antenna into digital data to be processed by, for example, processor 211. In some embodiments, computer 200 may process the data received from the UAV by updating the information displayed on a display being viewed by a user.

Figure 3A:
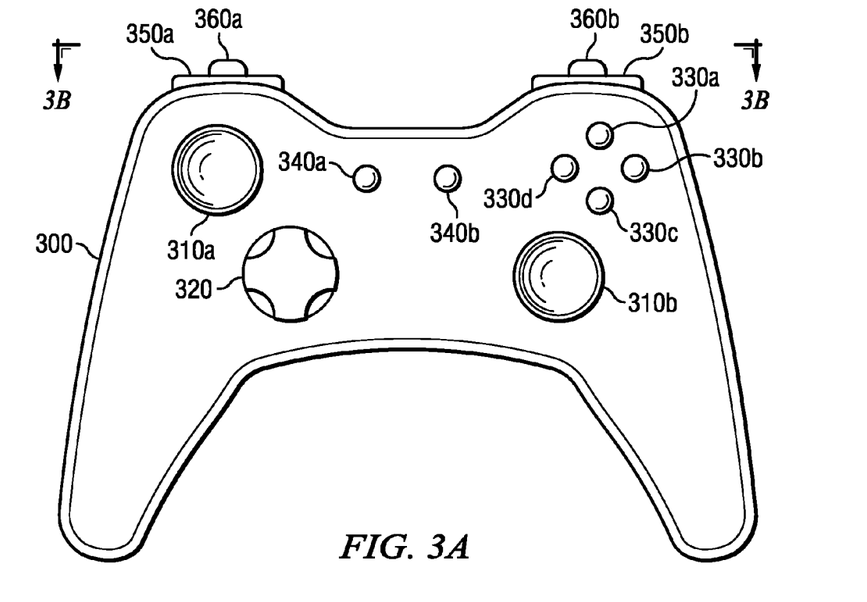
FIG. 3A is an overhead view of a gamepad used to control an unmanned aerial vehicle, in accordance with particular embodiments.
Figure 3B:
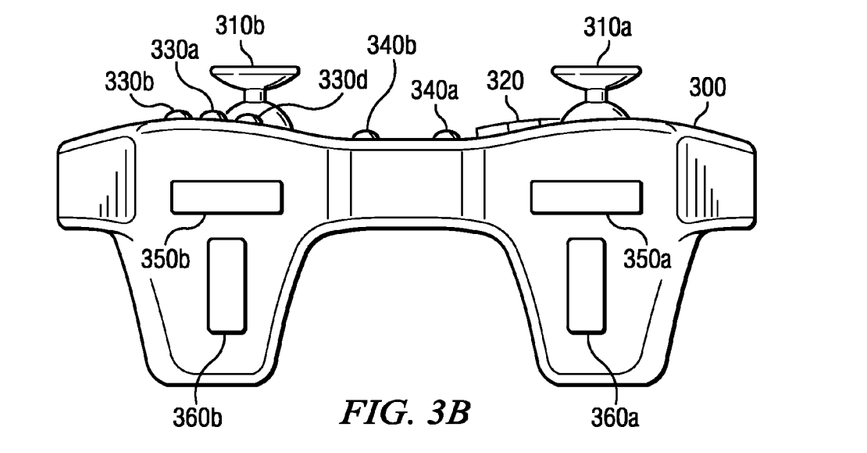
FIG. 3B is an end view of a gamepad used to control an unmanned aerial vehicle, in accordance with particular embodiments.

FIGS. 3A and 3B depict an overhead view and an end view, respectively, of a gamepad used to control an unmanned aerial vehicle, in accordance with particular embodiments. The various input components of gamepad 300 may be mapped to various input commands that are understood by, for example, path module 215a (discussed above with respect to FIG. 2). In discussing the input components of gamepad 300 an example mapping is used. Other embodiments may include other mappings, and the mappings may be altered or changed by a user on a per-session or per-user basis.

Thumb-sticks 310a and 310b (collectively thumb-sticks 310) may be analog, pressure sensitive, or otherwise able to provide a varying input signal. Thumb-sticks 310 allow a user greater control over how they interact with a GUI, as compared to an on/off type digital input component. For example, thumb-stick 310a may be mapped to panning commands. The farther a user moves thumb-stick 310a from its center position, the faster the GUI will pan across the displayed image. As another example, thumb-stick 310b may be mapped to camera perspective commands. The farther the user moves thumb-stick 310b to the left or the right, the faster the camera perspective rotates; and the farther the user moves thumb-stick 310b up or down, the faster the camera perspective shifts between an overhead and an underneath point of view. In some embodiments, thumb-sticks 310 may include a click feature in which the user may press down on the respective thumb-stick 310 to generate another input signal. For thumb-stick 310a, the click feature may be used to re-center the display image on the currently selected UAV (e.g., pan the displayed image back to the UAV). For thumb-stick 310b the click feature may be used to reset the camera perspective (e.g., north facing up and an overhead point of view).

Directional pad 320 may comprise four or eight discrete digital inputs. For example, directional pad 320 may comprise up, down, left, and right digital inputs. The directional inputs may be selected by a user, alone or in combination, to produce the desired directional signal. For example, pressing the up and the left inputs may create a diagonal directional input. When a menu has been called, directional pad 320 may be used to scroll through menu items. In some scenarios, when a menu is not currently active, directional pad 320 may be used to cycle through the different UAVs that are currently available for control.

Buttons 330a, 330b, 330c, and 330d (collectively buttons 330) may comprise simple switch type inputs. For example, gamepad 300 may simply generate an input signal saying that one or more of buttons 330 has been pressed. Depending on the scenario, buttons 330 may have the same or different functions depending on the context in which it is pressed. For example, if there is no menu open, button 330c may be pressed to call-up a menu; and if the user is navigating through a menu, button 330c may be used to select the currently highlighted menu item. Buttons 330a and 330d may be used to cycle through different paths for a particular UAV, regardless of whether there is a menu open or not. Button 330b may be used to close an opened menu.

Buttons 340a and 340b may be similar to buttons 330 in that they may comprise simple switch type inputs. In some embodiments, button 340a may be used to reset the flight time back to the actual current time. In some embodiments, button 340b may be customized based on a user preference. For example, the user may assign a particular UAV (e.g., a UAV for which the user is often modifying the future flight path) to button 340b. Then, regardless of what UAV is currently selected, when the user presses button 340b, the assigned UAV is selected.

Shoulder buttons 350a and 350b (collectively, shoulder buttons 350) may be switch type inputs or they may be pressure sensitive or analog inputs. In certain embodiments, shoulder buttons 350 may be used to move forward and backward through flight time. For example, shoulder button 350a may rewind flight time from the current flight time to the current actual time and shoulder button 350b may advance flight time from the current flight time to the end of the selected UAVs flight (e.g., the time at which the UAV has to land). Flight time may correspond to the time for which a UAV is flying. Flight time may begin at the current actual time (e.g., if it is currently 5:00 p.m. GMT, the flight time begins at 5:00 p.m. GMT) and ends at the end of the flight of the last UAV currently being controlled. In those embodiments in which shoulder buttons 350 are pressure sensitive (or analog) inputs, the harder (or the farther) a user presses one of shoulder buttons 350, the faster the system will scroll through flight time. In those embodiments in which shoulder buttons 350 are switch type inputs, the longer the user holds one of shoulder buttons 350, the faster the system will scroll through flight time.

Triggers 360a and 360b (collectively, triggers 360) may be analog or pressure sensitive inputs. In particular embodiments, triggers 360 may be used to zoom in or out of the displayed geographic area. For example, trigger 360a may be used to zoom out of the displayed geographic area and trigger 360b may be used to zoom in to the displayed geographic. In the case of triggers 360 being pressure sensitive inputs, the harder the user presses triggers 360, the faster the zooming operation may be performed. In the case of triggers 360 being analog inputs, the farther the user pulls triggers 360 from their normal position, the faster the zooming operation may be performed.

While the input components of gamepad 300 have been described as being mapped to particular functions and comprising various types of inputs (e.g., analog, pressure sensitive, and switch type inputs) it is not required that the identified input component comprise the described mapping or type of input. For example, button 330d may be pressure sensitive or triggers 360 may be mapped to control flight time. Moreover, particular embodiments may employ different input types, such as a resistive or capacitive touch screen.

Figure 4:
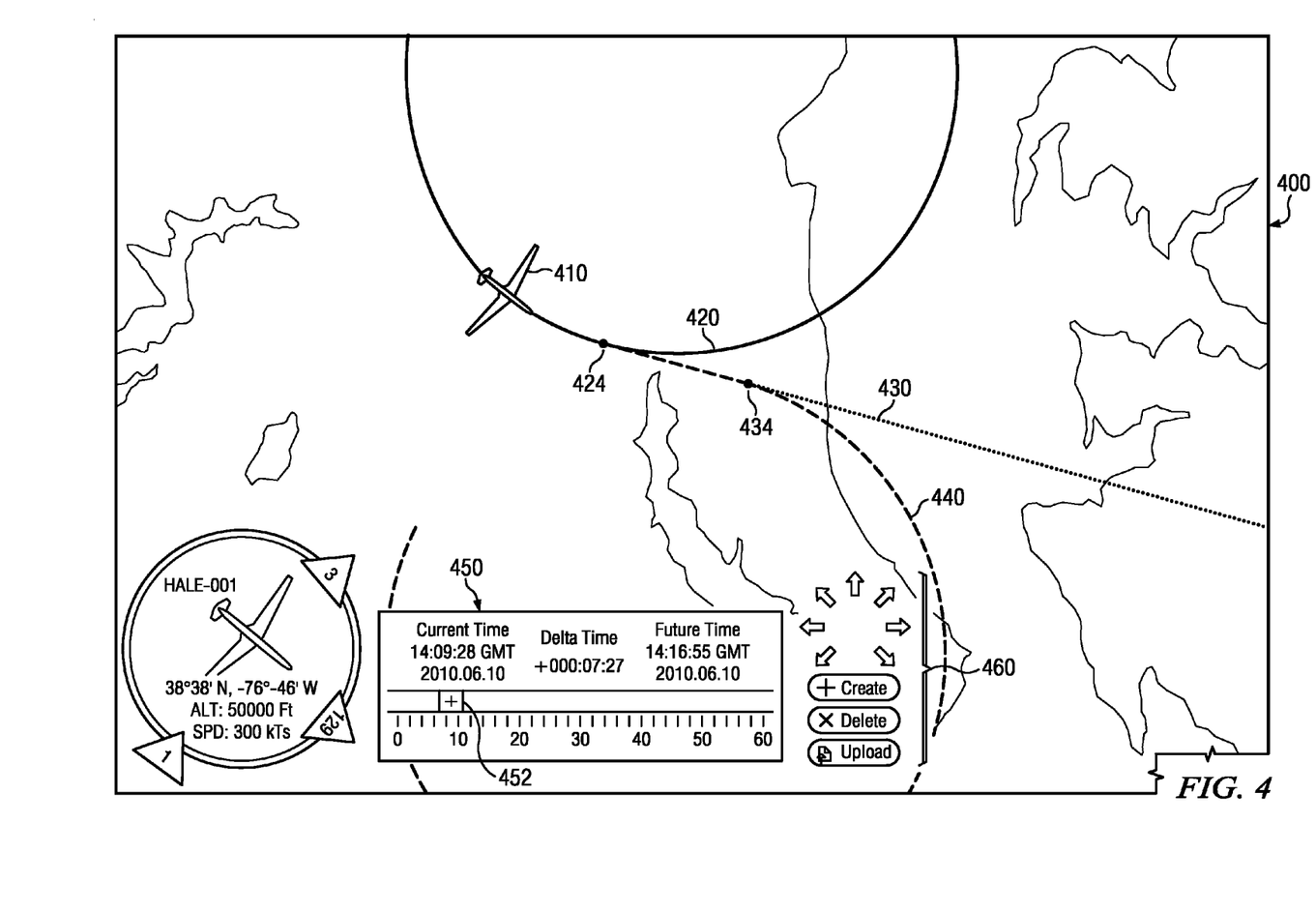
FIG. 4 is an example screenshot from a display used to control an unmanned aerial vehicle using a gamepad, in accordance with particular embodiments.
Figure 5:
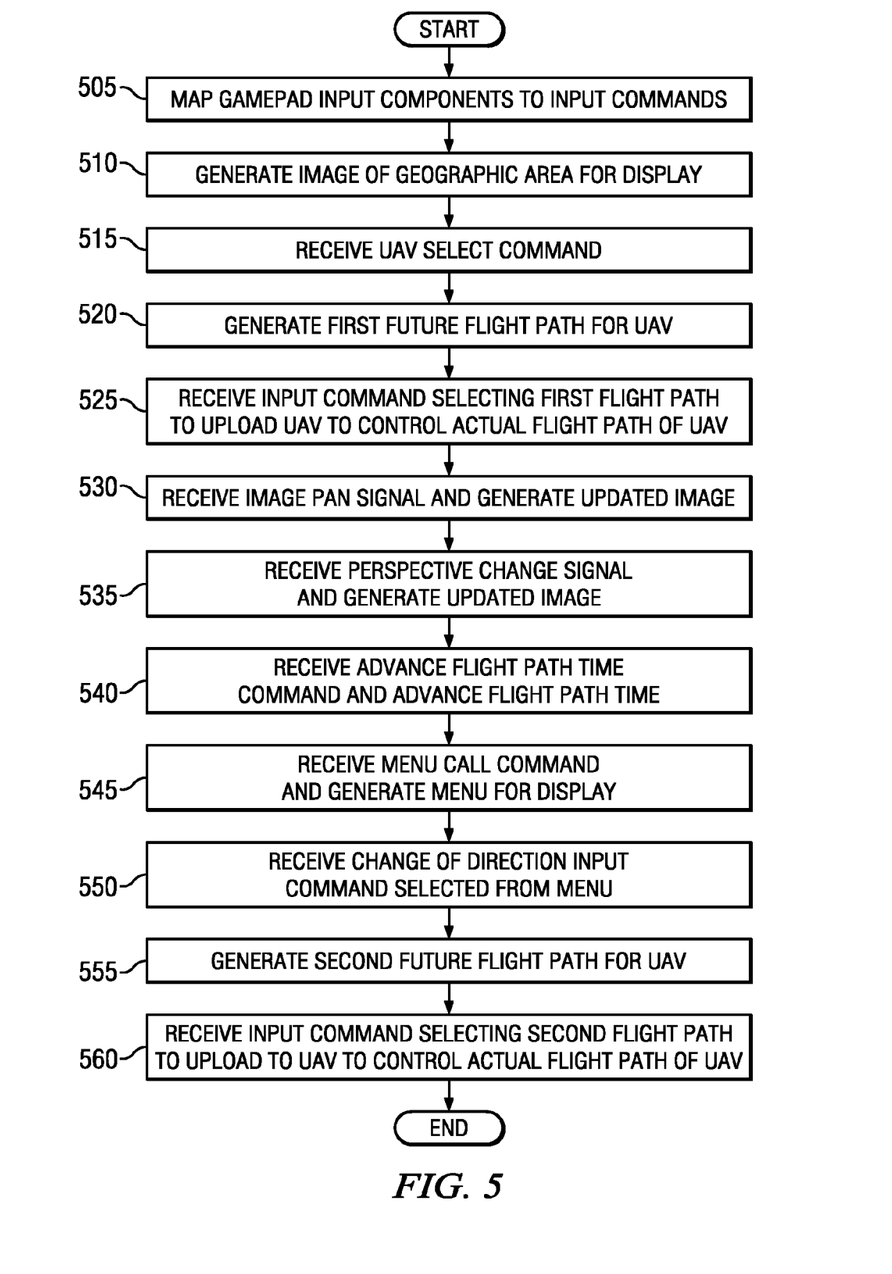
FIG. 5 is a method for controlling an unmanned aerial vehicle using a gamepad, in accordance with particular embodiments.

FIG. 4 is an example screenshot from a display used to control an unmanned aerial vehicle using a gamepad, in accordance with particular embodiments. FIG. 5 is a method for controlling an unmanned aerial vehicle using a gamepad, in accordance with particular embodiments. FIGS. 4 and 5 will be discussed together.

The method begins at step 505, with the mapping of gamepad input components to input commands. The input commands may be used to create, modify and/or select future flight paths. In particular embodiments, the mapping may be a general or generic mapping used by many, or all, of the users of the UAV control system. In some embodiments, the mapping may be unique to the particular user. For example, each user may create their own specific mapping. In some embodiments, the mapping may be changed by the user.

At step 510 an image of a geographic area is generated for display on a display device. The displayed geographic area may comprise the geographic area centered on one or more UAVs, a targeted area in which one or more UAVs are to fly, or any other area that may be of interest. A user may be able to change and/or manipulate the displayed geographic area using the gamepad. For example, moving a left thumb-stick to the left may cause the displayed geographic area to pan to the left. Along with the geographic area, future flight paths may also be displayed on the display device. This can be seen in screenshot 400.

At step 515 a UAV select command is received. The UAV select command may select the UAV for which the user wishes to create, modify, or select a future flight path. In some embodiments, the UAV may be selected in a sequential manner by the user pressing up or down on a directional pad of the gamepad. In certain embodiments, the user may select the UAV by using a button on the gamepad to call-up a menu listing the available UAVs. The user may then use the directional pad to select the desired UAV from the menu. In screenshot 400, UAV 410 has been selected.

At step 520 a first future flight path is generated for a particular UAV. The generated first future flight path may vary depending on when step 520 is performed with respect to overall flight time. For example, the first future flight path may initially be a substantially straight line projecting along the UAV's current heading. Over time, as the user changes and adds additional future flight paths, subsequent performances of step 520 may result in generating different future flight paths. For example, in screenshot 400 any or all of future flight paths 420, 430, or 440 may be the first future flight path generated at step 520. In some embodiments, step 520 may be performed several times, in parallel or sequentially, before the method advances to step 525. For example, step 520 may be repeated three times to generate the three future flight paths, future flight paths 420, 430, and 440, before continuing to step 525.

At step 525 an input command selecting the first future flight path to be uploaded to the appropriate UAV is received. The input command may be received as a selection from a menu. For example, a user may select use a gamepad's directional pad to select the upload command shown in menu 460. Both the menu call and the selection may be received from a gamepad. Once uploaded, the selected first future flight path may be the bases for the actual flight path flown by the UAV. The selected first future flight path may be uploaded to the UAV at any time before or during the UAV's flight. Depending on the embodiment, the selected first future flight path may be sent to a UAV controller. The UAV controller may then translate the first future flight path into navigational commands that are understood by the UAV.

At step 530, an image pan signal is received and an updated image is generated. The image pan signal may be based on input from a thumb-stick of a gamepad. For example, the user may move the thumb-stick of the gamepad in a particular direction to generate a pan signal in the corresponding direction. In some embodiments, the farther the user moves the thumb-stick in the particular direction, the faster the displayed image may pan in the corresponding direction. The user may use the pan signal to adjust or change the geographic area that is displayed. The image generated at step 530 may include the updated geographic area as well as any future flight paths that may, at some point during their flight time, pass over the displayed geographic area. In certain embodiments, the displayed image may be generated and updated as the pan signal is being received. This may allow the user to see the geographic area over which he is panning, as the panning is in progress.

At step 535 a perspective change signal may be received and an updated image may be generated. The perspective change signal may rotate or tilt the displayed image. For example, if the user moves a thumb-stick on the gamepad to the left or the right the displayed image may rotate counter-clockwise or clockwise, respectively. As another example, if the user moves the thumb-stick on the gamepad up or down the perspective of the displayed image may tilt towards an overhead view of the future flight paths or an underneath view of the future flight paths, respectively. In some scenarios, the user may move the thumb-stick in multiple directions at once (e.g., up and to the left). This may result in the displayed image rotating and tilting at the same time. In some embodiments, the farther the user moves the thumb-stick from its center position, the faster the displayed perspective changes. In certain embodiments, the displayed image may be generated and updated as the perspective change signal is received.

At step 540 an advance flight time command is received and flight time is advanced. As the user advances time, marker 452 in time display 450 may move left or right, based on the requested change in flight time. In addition, UAV 410 may move backward or forward along its future flight paths. This may orient the user as to where he is in the UAV's flight time. In some embodiments, the advance flight time command may be received via a shoulder button of a gamepad. Though not depicted, a rewind flight time command may also be received. Advancing (or rewinding) flight time may allow the user to control the time at which the UAV makes a change in its flight path. The rewind flight time command may be received via a different shoulder button on a different side of the gamepad than the advance flight time command. For example, the advance flight time shoulder button may be on a right side of the gamepad and a rewind flight time shoulder button may be on a left side of the gamepad. In some embodiments, the longer a user holds down the advance (or rewind) flight time button, the faster flight time is advanced.

At step 545 a menu call command is received and a menu for display is generated. The menu call command may be entered by a user pressing a particular button on the gamepad. Although not depicted in FIG. 5, the method may also include a menu close command which closes the menu and removes it from the displayed image. The generated menu may be displayed as an overlay or a pop-up menu on top of the displayed geographic area and/or future flight paths. Menu 460 is displayed as an overlay in screenshot 400. The contents of the menu may be based on the context in which it was called. For example, if a particular UAV is selected, and no menu is currently displayed, the menu call command may result in generating a menu comprising a list of available commands for the selected UAV. In menu 460, the list of available commands includes seven different directional changes, a create command, a delete command, and an upload command. In some embodiments, the contents of the menu may be based on navigation and/or UAV control commands that are understood by a UAV controller and/or the selected UAV.

At step 550 a change of direction command selected from the menu is received. The user may use a directional pad on the gamepad to scroll through the contents of menu 460. Once the user has highlighted the desired command, the user may press a button on the gamepad to select the highlighted command. The received change of direction command may be associated with the particular flight time to which the user has advanced at step 540. In some scenarios, the command received at step 550 may be to delete a particular future flight path, or a portion thereof.

At step 555 a second future flight path is generated for the UAV for which the change of direction command is received at step 550. The change of direction command received at step 550 may create a branch point in the first future flight path of the UAV. The branch point may correspond to the time at which the user advanced the flight time at step 540. The branch point may be the point in flight time at which the second future flight path deviates from the first future flight path (e.g., the first and second future flight paths may be substantially similar prior to the branch point). For example, in screen shot 400 there are two branch points, branch points 424 and 434. If branch point 434 was created at step 550, then the generated second future flight path may be future flight path 440. UAV 410's flight path along future flight path 440 may begin with a counter-clockwise circular flight path (e.g., along future flight path 420). Then at branch point 424 UAV 410 may straighten out and fly in a straight flight path (e.g., along future flight path 430). Because branch point 424 has a flight time associated with it, the user may be able to have UAV 410 fly in multiple circles before straightening out at the associated flight time. At branch point 434, UAV 410 may begin a clockwise circular flight path. In addition to the first and second future flight paths being displayed, all other future flight paths for all other UAVs in the displayed geographic area may also be displayed.

At step 560 an input command selecting the second flight path may be received. The selected second flight path may be uploaded to the UAV to control the actual flight path of the UAV. The user may select the second flight path by using the gamepad to select an appropriate command from a menu, such as the menu called and generated at step 545. Once the second future flight path has been uploaded to the UAV, the second future flight path may replace any previous future flight paths uploaded to the UAV. In some embodiments or scenarios, the user may create several future flight paths. Then, over the course of a UAV's flight, the user may change the selected future flight path numerous times.

One or more of the steps illustrated in FIG. 5 may be combined, modified, or deleted where appropriate and additional steps may also be added to the flowchart. For example, a user may change the perspective and then pan the displayed image (switching the order of steps 530 and 535); or the user may repeat at least steps 550-555 several times before step 560 is performed. Additionally, the steps may be performed in any suitable order without departing from the scope of particular embodiments.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within UAV control system 100, such as gamepads, displays, UAV controllers, these elements may be combined, rearranged or positioned in order to accommodate particular UAV control needs. In addition, any of these elements may be provided as integrated or separate external components where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A system for controlling one or more unmanned aerial vehicle, comprising:
    a path creation module configured to create one or more future flight paths for the one or more unmanned aerial vehicles (UAVs), each future flight path comprising one or more branch points marking a change in the UAV's flight path;
    a display configured to present a graphical user interface comprising:
        a three-dimensional view of a geographic area;
        one or more lines representing each of the one or more future flight paths for the one or more UAVs; and
        a menu comprising one or more commands available for selection;
    a gamepad comprising:
        at least one first thumb-stick configured to adjust the geographic area displayed on the display;
        at least one second thumb-stick configured to adjust a camera perspective of the displayed geographic area;
        at least two time buttons configured to scroll through a flight time, the flight time beginning with a current actual time and ending with the end of the one or more UAV's flight; and
        a plurality of buttons configured to select at least one command from the menu, the selected command associated with a current flight time selected by the at least two time buttons, the plurality of buttons further configured to select a first future flight path of the one or more future flight paths to be sent to the UAV to control an actual flight path of the UAV,
    wherein at least one of the first and second thumb-sticks is pressure sensitive and is configured to output a control signal to the path creation module configured to create the one or more future flight paths, wherein pressure indicated by the control signals vary the extent and degree of left and right turns of the at one or more flight paths.

2. The system of claim 1, wherein the one or more commands available for selection comprise one or more commands associated with UAV commands known by a UAV navigation system.

3. The system of claim 1, wherein the plurality of buttons are further configured to select a second future flight path of the one or more future flight paths, the selected second future flight path sent to the UAV to replace the first future flight path and to control the actual flight path of the UAV.

4. The system of claim 1, wherein the at least one second thumb-stick configured to adjust the camera perspective of the displayed geographic area is further configured to:
 rotate the camera perspective such that the displayed geographic area rotates in response to a left or a right movement of the thumb-stick; and
 adjust a point of view of the camera perspective such that the point of view is adjusted between an overhead point of view and an underneath point of view.

5. The system of claim 1, wherein at least one of the at least one first thumb-stick configured to adjust the geographic area displayed on the display, the at least one first thumb-stick configured to adjust the camera perspective of the displayed geographic area, the at least two zoom buttons, and the at least two time buttons are pressure sensitive.

6. The system of claim 1, wherein at least one of the at least one first thumb-stick configured to adjust the geographic area displayed on the display, the at least one second thumb-stick configured to adjust the camera perspective of the displayed geographic area, the at least two zoom buttons, and the at least two time buttons are analog.

7. The system of claim 1, wherein the gamepad further comprises a directional pad configured to switch between different UAVs of the one or more UAVs.

8. The system of claim 1, wherein the at least two time buttons configured to scroll through the flight time comprise:
 a right shoulder button configured to advance flight time from the current flight time to the end of the UAV's flight; and
 a left shoulder button configured to rewind flight time from the current flight time to the current actual time.

9. The system of claim 1, wherein the gamepad further comprises at least two zoom buttons configured to adjust a zoom of the camera perspective.

10. A method for controlling an unmanned aerial vehicle, comprising:
 generating an image of a geographic area for display on a display device;
 generating a first future flight path for at least one unmanned aerial vehicle (UAV);
 receiving a first input command from a gamepad; advancing a flight time to a first time based on the first input command;
 receiving a second input command from the gamepad; modifying the first future flight path based on the second input command;
 generating a second future flight path based on the modification of the first future flight path, the second future flight following the first future flight path for the first time and branching from the first future flight at the first time based on the second input command; and
 outputting a control signal indicating a pressure strength to generate the first and second future flight paths, wherein pressure strength indicated by the control signals varies the extent and degree of left and right turns of the first and second future flight paths; and
 receiving from the gamepad a third input command selecting a first selected flight path from among at least the first or the second future flight paths, the first selected flight path to be uploaded to control the actual flight path of the UAV.

11. The method of claim 10, further comprising receiving from the gamepad a fourth input command selecting a second selected flight path from among at least the first or the second future flight paths, the second selected flight path uploaded to replace the first selected flight path and to control the actual flight path of the UAV.

12. The method of claim 10, further comprising:
 receiving from a first thumb-stick of the gamepad an image pan signal indicating a change in the image of the geographic area displayed on the display device; and
 generating an updated image of a different geographic area for display on the display device based on the image pan signal.

13. The method of claim 12, wherein generating an updated image comprises panning from the image of the geographic area to the updated image of the different geographic area wherein a rate at which the image is panned is based on the distance the first thumb-stick is moved from its center position.

14. The method of claim 10, further comprising:
 receiving from a second thumb-stick of the gamepad the camera perspective change signal indicating a change in the perspective of the image of the geographic area displayed on the display device; and
 generating an updated image of the geographic area for display on the display device based on the camera perspective change signal, wherein generating the updated image comprises:
  upon receiving a camera perspective change signal indicating that the second thumb-stick has moved to left or right, rotating the image of the geographic area in the first or second direction; and
  upon receiving a camera perspective change signal indicating that the second thumb-stick has moved up or down, tilting the image of the geographic area in a first tilt direction or a second tilt direction.

15. The method of claim 10, wherein receiving a second input command from the gamepad comprises:
 receiving a menu call command from the gamepad, the menu call command requesting that a menu be displayed on the display device;
 generating the menu for display on the display device; and
 receiving a menu selection from the gamepad, the menu selection requesting the second input command.

16. The method of claim 10, wherein receiving the second input command from the gamepad comprises receiving a change of direction input command specifying a change of direction for the UAV that modifies the first future flight path, the change of direction input command selected by the gamepad from a menu of available input commands understood by a UAV controller.

17. The method of claim 10, further comprising receiving from a directional pad of the gamepad a UAV select command, the UAV select command selecting a different UAV from a UAV currently selected before the UAV select command is received.

18. The method of claim 10, further comprising mapping a plurality of input components of the gamepad to a plurality of input commands.

19. The method of claim 10, further comprising, receiving the third input command from a click of a thumb-stick of the gamepad, the third input command resetting the flight time to the current actual time.

20. A system for controlling at least one unmanned aerial vehicle, comprising:
- means for mapping a plurality of input commands to a plurality of input components of a gamepad;
- means for generating an image of a geographic area for display on a display device;
- means for generating a first future flight path for the at least one unmanned aerial vehicle (UAV);
- means for receiving a first input command from a gamepad;
- means for advancing the flight time to a first time based on the first input command;
- means for receiving a second input command from the gamepad;
- means for modifying the first future flight path based on the second input command;
- means for generating a second future flight path based on the modification of the first future flight path, the second future flight following the first future flight path for the first time and branching from the first future flight at the first time based on the second input command;
- a pressure sensing means configured to receive an physical input and to output a control signal to the at least one of first means for generating a first future flight path and the second means for generating a second future flight path, wherein pressure indicated by the control signal varies the extent and degree of left and right turns of at least one the first and second paths; and
- means for receiving from the gamepad a third input command selecting a first selected flight path from among at least the first or the second future flight paths, the first selected flight path to be uploaded to control the actual flight path of the UAV.

* * * * *